United States Patent [19]

O'Brien et al.

[11] Patent Number: 5,392,650
[45] Date of Patent: Feb. 28, 1995

[54] MICROMACHINED ACCELEROMETER GYROSCOPE

[75] Inventors: Benedict B. O'Brien, Manhattan Beach; Brent E. Burns, Torrance, both of Calif.; John A. Geen, Wrentham, Mass.

[73] Assignee: Northrop Grumman Corporation, Los Angeles, Calif.

[21] Appl. No.: 52,017

[22] Filed: Apr. 22, 1993

Related U.S. Application Data

[63] Continuation-in-part of Ser. No. 640,449, Jan. 11, 1991, Pat. No. 5,205,171.

[51] Int. Cl.$^6$ .................. G01P 15/125; G01C 19/56
[52] U.S. Cl. .................... 73/517 A; 73/505; 73/517 AV
[58] Field of Search ............ 73/504, 505, 517 AV, 73/517 B, 517 A

[56] References Cited

U.S. PATENT DOCUMENTS

| | | | |
|---|---|---|---|
| 4,336,718 | 6/1982 | Washburn | 73/517 B |
| 4,483,194 | 11/1984 | Rudolf | 73/517 |
| 4,510,802 | 4/1985 | Peters | 73/505 |
| 4,512,192 | 4/1985 | Peters | 73/505 |
| 4,553,436 | 11/1985 | Hansson | 73/517 |
| 4,583,404 | 4/1986 | Bernard et al. | 73/517 B |
| 4,584,885 | 4/1986 | Cadwell | 73/862.61 |
| 4,592,233 | 6/1986 | Peters | 73/505 |
| 4,660,418 | 4/1987 | Greenwood et al. | 73/514 |
| 4,679,434 | 7/1987 | Stewart | 73/517 B |
| 4,699,006 | 10/1987 | Boxenhorn | 73/517 AV |
| 4,744,248 | 5/1988 | Stewart | 73/505 |
| 4,750,364 | 6/1988 | Kawamura et al. | 73/510 |
| 4,766,768 | 8/1988 | Norling et al. | 73/497 |
| 4,841,773 | 6/1989 | Stewart | 73/510 |
| 4,884,446 | 12/1989 | Ljung | 73/505 |
| 4,945,765 | 8/1990 | Roszhart | 73/517 |
| 5,006,487 | 4/1991 | Stokes | 437/228 |
| 5,008,774 | 4/1991 | Bullis et al. | 361/283 |
| 5,016,072 | 5/1991 | Greiff | 357/26 |
| 5,025,346 | 6/1991 | Tong et al. | 73/517 AV |
| 5,241,861 | 9/1993 | Hulsing, II | 73/505 |

OTHER PUBLICATIONS

L. Roylance, "A Batch-Fabricated Silicon Accelerometer" IEEE Transactions on Electron Devices, vol. ED-26, No. 12, Dec. 1979, pp. 1911-1917.
J. Angell et al., "Silicon Micromechanical Devices", Scientific American, Apr. 1983, pp. 44-55.
F. Goodenough, "Airbags Boom When IC Accelerometer Sees 50G", Electronic Design, Aug. 8, 1991, pp. 45-56.

*Primary Examiner*—Hezron E. Williams
*Assistant Examiner*—Michael J. Brock
*Attorney, Agent, or Firm*—Terry J. Anderson; Karl J. Hoch, Jr.

[57] ABSTRACT

An integrated rate and acceleration sensor includes at least one accelerometer formed from a substantially planar silicon body. The at least one micro-silicon accelerometer (MSA) includes a first frame and a proof mass suspended from the first frame by first flexures. The at least one accelerometer has an associated sensitive axis and an associated rate axis that is orthogonally disposed to the sensitive axis. The integrated sensor further includes structure for dithering or vibrating the proof mass along a dither axis that is disposed perpendicularly to both the rate and the sensitive axes. The dithering structure includes at least first and second interdigitated electrodes. Finger portions of the electrodes are disposed for exerting an electrostatic force upon a portion of the planar body in response to an oscillatory drive signal. The portion of the planar body has a plurality of linear grooves formed therein, the plurality of linear grooves being disposed in a parallel orientation with the finger portions. A vibrating accelerometer gyro (VAG) structure is constructed by micromachining techniques such that the linear momenta of two vibrating MSAs balance one another. A symmetrical disposition of the vibrating proof masses tends to balance the linear momenta of the MSAs, and increases the resonance amplification factor (Q).

20 Claims, 7 Drawing Sheets

VIBRATION DIRECTION | RATE AXIS | ACCELERATION AXIS

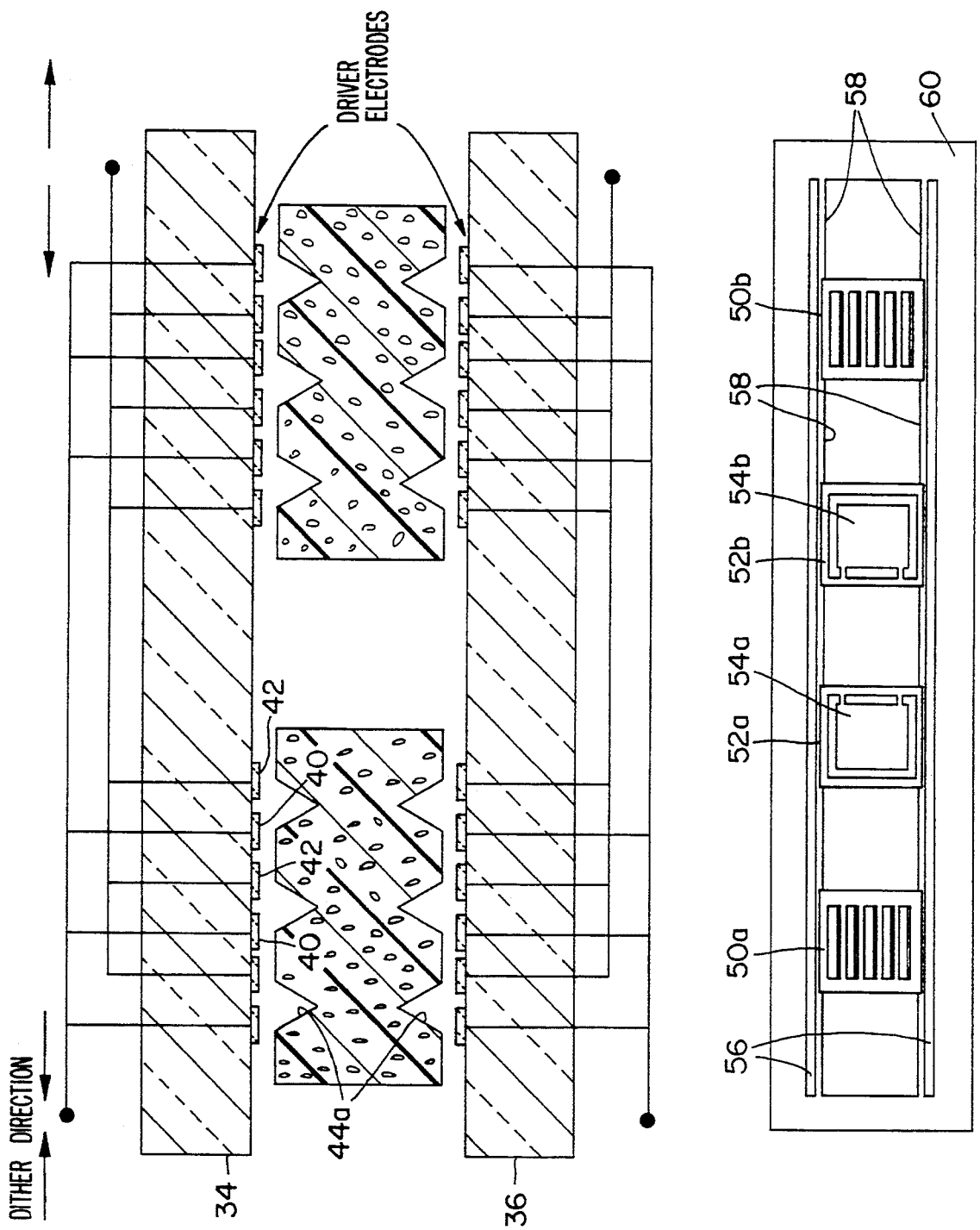

FIG. 11a
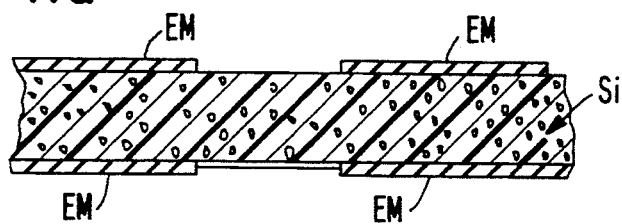
FIG. 11b
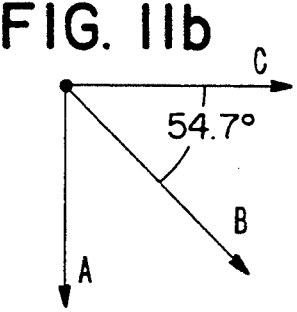
FIG. 11c
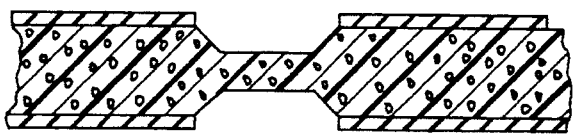
FIG. 11d
FIG. 11e
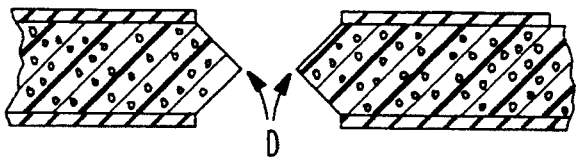
FIG. 11f
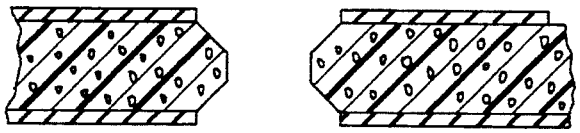
FIG. 11g    FIG. 11h    FIG. 11i
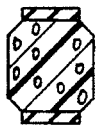 
FIG. 12
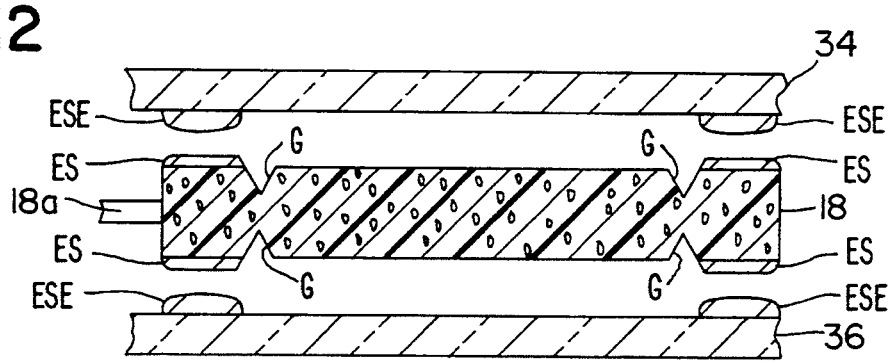

MICROMACHINED ACCELEROMETER GYROSCOPE

REFERENCE TO A RELATED PATENT APPLICATION

This patent application is a continuation-in-part of commonly assigned U.S. patent application Ser. No. 07/640,449, now U.S. Pat. No. 5,205,171, filed Jan. 11, 1991, entitled "Miniature Silicon Accelerometer and Method" by Benedict B. O'Brien, Brent E. Burns, and John A. Geen. The disclosure of U.S. patent application Ser. No. 07/640,449 is incorporated by reference herein in its entirety.

FIELD OF THE INVENTION

This invention relates generally to sensors of acceleration and rotation and, in particular, to an integrated sensor fabricated from semiconductor material.

BACKGROUND OF THE INVENTION

Mechanical gyroscopes are most commonly manufactured to include rotating structures. Spinning rotors have the advantage of producing large signals and, thus, provide high accuracy. However, the required bearings cause such instruments to wear out, and also make them unsuitable for the very low cost manufacturing techniques now available by micromachining silicon.

It has been recognized that vibration rather than rotation can also be used (Meredith, U.K. Patent 12539/42), and devices using vibration have been described (Morrow, Barnaby, and Nevala, U.S. Pat. No. 2,683,596). However, despite their long life, these instruments required such careful control of material uniformity and difficult mechanical balance that their cost-to-performance ratio was found to be uncompetitive with conventional rotating gyros.

There have been a number of attempts to construct micromachined gyroscopes using vibrating structures. Ljung (U.S. Pat. No. 4,884,446) and Greiff (U.S. Pat. No. 5,016,072) both describe structures which are potentially less expensive than those assembled from macroscopic parts. However, both of these approaches use angular vibration. The angular vibration is of restricted amplitude and consequently produces only very small Coriolis signals in response to rotation. As a result, both use resonant sensing elements at frequencies close to the vibration frequency in order to detect the small signals. However, this type of detection suffers practical problems. For example, the relative stability of the two frequencies affect scale factor, output noise results at the difference between the two frequencies, and a basic conflict exists between sensitivity and bandwidth. Also, both of these approaches use resonator structures which are difficult to directly fabricate to the high precision of balance needed for accurate gyroscopes. Any subsequent mechanical trimming is an expensive production process.

It is known that the vibration of a pair of accelerometers can form an instrument which will yield both gyroscopic and acceleration information. As well as the advantage of giving acceleration, which saves the expense of separate accelerometers in inertial applications, these instruments do not normally experience the difficulties associated with resonant sensing elements. Peters (U.S. Pat. No. 4,512,192) and Stewart (U.S. Pat. No. 4,744,248 and 4,841,773) reveal such structures that are assembled from macroscopic parts. However, their geometries are not suitable for fabrication by micromachining. Generically, such instruments giving both gyroscopic and acceleration information are known as multisensors.

It is known that an accelerometer structure can be fabricated from a body of semiconductor material, such as silicon, by so-called micromachining techniques. One suitable micromachining technique involves masking a body of silicon in a desired pattern, and then deep etching the silicon to remove portions thereof. The resulting three-dimensional silicon structure functions as a miniature mechanical device, for example an accelerometer that includes a proof mass suspended by a flexure.

In this regard reference is made to the following U.S. Pat. Nos. 5,006,487, "Method of Making an Electrostatic Silicon Accelerometer"; 4,945,765, "Silicon Micromachined Accelerometer"; and 4,699,006, "Vibratory Digital Integrating Accelerometer".

It is also known that gyroscopic information is available from vibrating accelerometers via the Coriolis effect. In this regard reference is made to the following U.S. Pat. Nos. 4,884,446, "Solid State Vibrating Gyro"; 4,841,773, "Miniature Inertial Measurement Unit"; and 4,744,248, "Vibrating Accelerometer-Multisensor".

U.S. Pat. No. 5,016,072, "Semiconductor Chip Gyroscopic Transducer", describes a micromechanical gyroscopic transducer that is formed from a mass of N-type silicon. Closed-loop rebalancing is said to be facilitated by the use of two quadrature servo-loops.

U.S. Pat. No. 4,512,192, "Two Axis Angular Rate and Specific Force Sensor Utilizing Vibrating Accelerometers", shows a two axis angular rate measuring system that includes two accelerometers having force sensing axes aligned at 90° to each other and vibrating along an axis normal to the force sensing axes. A triaxial angular rate and force sensor is provided by combining two such sets of vibrating accelerometers, where the axes of vibration are normal to each other.

OBJECTS OF THE INVENTION

It is an object of this invention to provide an improved gyroscopic mechanism that employs a vibration of a bulk, micromachined accelerometer.

It is a further object of this invention to provide an improved micromachined vibrating accelerometer gyroscope in which vibration flexures are produced in the same semiconductor structure as the accelerometer, and by the same deep etching process.

It is another object of this invention to provide an improved micromachined vibrating accelerometer gyroscope in which the outputs of two accelerometers are combined to produce greater accuracy of output.

Another object of this invention is provide an improved micromachined vibrating accelerometer gyroscope in which vibratory drive is produced by balanced electrostatic drivers that work by fringing fields from edges of the structure. In particular, the invention provides drivers in which an effective edge length is increased by etching a plurality of trenches in the structure, and also by forming interdigitated drive electrodes.

A still further object of this invention is to provide a micromachined vibrating accelerometer gyroscope in which a plurality of accelerometers and associated drivers form a symmetric resonating structure in which both linear and angular momenta cancel.

SUMMARY OF THE INVENTION

The foregoing objects are realized by an integrated rate and acceleration sensor (multisensor) that is constructed and operated in accordance with this invention.

A micromachined multisensor has a quadrilateral set of flexures and edge-effect electrostatic drivers to give relatively large, well controlled linear vibrational velocities to the accelerometers. The novel geometry, together with the inherent accuracy and sensitivity of the accelerometers, yields a signal-to-noise ratio that is suitable to provide an accurate gyroscope. Also, the resonator geometry and construction yields the inherently good balance and planarity of vibration that is required to obtain good gyroscope performance. The flexure and driver structures are produced in silicon by the same etching process which forms the accelerometer portions of the structure. Thus, a very economical monolithic multisensor structure is provided.

The multisensor of this invention includes at least one accelerometer formed from a substantially planar body comprised of semiconductor material. The at least one accelerometer includes a first frame and a proof mass suspended from the first frame by first flexures. The at least one accelerometer has an associated sensitive axis and an associated rate axis that is orthogonally disposed to the sensitive axis.

The integrated sensor further includes structure for dithering or vibrating the proof mass along a dither axis that is disposed perpendicularly to both the sensitive and the rate axes. The dithering structure includes at least first and second electrodes each having a plurality of elongated finger portions that are disposed in parallel and interdigitated one with another. The finger portions are disposed for exerting an electrostatic force upon a portion of the planar body in response to an oscillatory drive signal. The portion of the planar body has a plurality of linear grooves formed therein, the plurality of linear grooves being disposed in a parallel orientation with the finger portions. This arrangement beneficially increases the effective edge length that is acted upon by the interdigitated electrodes, and thus serves to increase the electrostatic force that acts on the planar silicon body.

Further in accordance with this invention, a vibrating accelerometer gyro (VAG) structure is constructed by micromachining techniques such that the linear momenta of two vibrating Micromachined Silicon Accelerometers (MSAs) balance one another. In this embodiment of the invention, the VAG includes a silicon structure that is processed to form two MSA structures. The silicon structure is interposed between a top glass plate and a bottom glass plate. The glass plates include MSA electrodes and dither electrodes. The silicon structure has a transverse axis of symmetry such that one of the MSA structures is substantially the mirror image of the other. This symmetrical disposition of the vibrating proof masses tends to balance the linear momenta of the MSAs, and increases the resonance amplification factor (Q).

In a presently preferred embodiment of the invention two electrostatic grooved driver masses are provided separately from two MSAs and are disposed between the MSAs. A centrally provided silicon frame is employed in conjunction with the outer silicon frame for bonding to the overlying and underlying glass plates. A first MSA is dithered in a direction perpendicular to the rotation sensing rate axis. The second MSA is simultaneously dithered in antiphase (180° out of phase) with the first MSA. This enables the gyroscopic and acceleration signals to be separated by subtraction and addition, as well as by frequency domain filtering. The MSAs and driver masses are interconnected to one another and to the outer frame by a plurality of flexures that form a part of the micromachined silicon structure.

As will become apparent in the ensuing detailed description of this invention, advantages of the improved micromachined vibrating accelerometer gyroscope include the following.

First, acceleration and gyroscopic information are both available from one sensor. This provides a considerable cost benefit.

Second, the accelerometer and its vibration mechanism are simultaneously manufactured from bulk monocrystalline silicon by anisotropic etching. This provides a low cost structure having the advantages of high strength and perfect elasticity that are associated with monocrystalline silicon.

Third, the structure is inherently balanced by design. That is, it is relatively insensitive to micromachining tolerances. As such, the structure does not require mechanical trimming to achieve gyroscopic balance. Also, the angular and linear momenta associated with moving parts are made to cancel one another, eliminating unwanted dynamic interactions with a mounting surface which would otherwise destabilize the gyroscope function.

Fourth, the sensing elements are force rebalanced by closing servomechanism loops around the accelerometer sensing elements. This provides the advantages of good scale factor, linearity and accuracy, wide dynamic range, and a large signal to noise ratio.

BRIEF DESCRIPTION OF THE DRAWINGS

The above set forth and other features of the invention are made more apparent in the ensuing Detailed Description of the Invention, when read in conjunction with the attached Drawings, wherein:

FIG. 4 is a cross-sectional view showing the grooved driver masses and corresponding interdigitated phase and antiphase electrodes;

FIG. 5 is a top enlarged view showing an embodiment of a VAG having driver masses coupled to MSAs via flexures;

FIGS. 11a-11i are useful in describing a method of etching a silicon body to form the flexures and other components of the VAG of FIG. 10; and FIG. 12 is a cross-sectional view, not to scale, that illustrates in greater detail the proof mass end stop of FIG. 10 and corresponding the end stop electrodes.

DETAILED DESCRIPTION OF THE INVENTION

The improved micromachined vibrating accelerometer gyroscope that is the subject of this invention employs a sensor based on the accelerometer structure described in U.S. patent application Ser. No. 07/640,449, the disclosure of which has been incorporated by reference herein in its entirety.

As employed herein, an inherently balanced structure is one which has bilateral symmetry in the three orthogonal directions, and wherein the dimensions of opposing components (such as the flexures, masses, and gaps to glass) are produced by the same processes at the same time so that, without trimming, they match to within very small tolerances. As will become apparent below, the combined angular rate and acceleration sensor that is the subject of this patent application is an inherently balanced structure.

Figure 1:
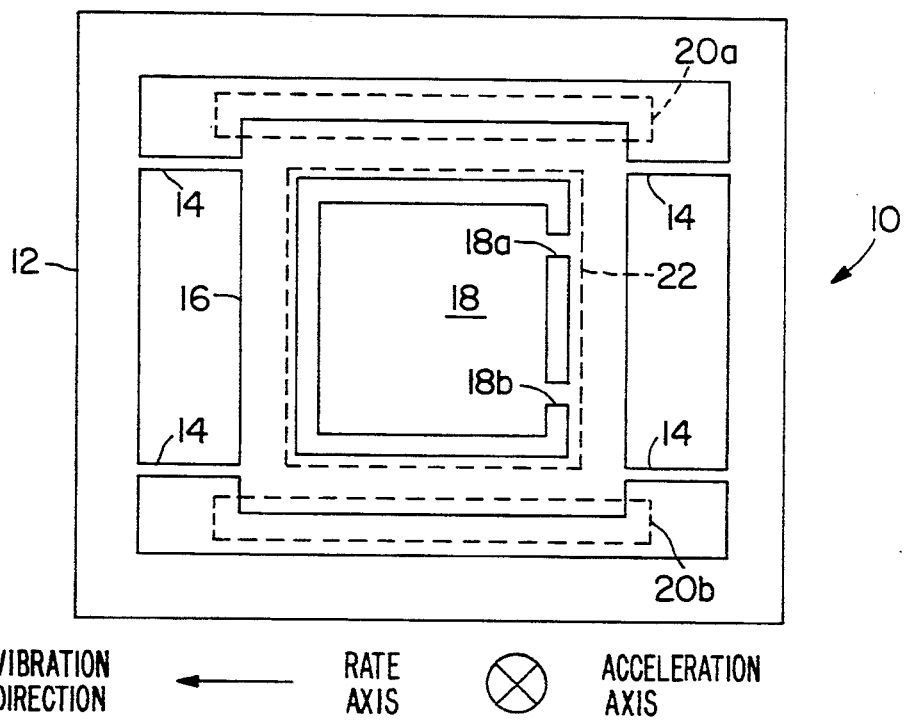
FIG. 1 is a simplified top view of a Micro-Silicon Accelerometer (MSA) -based Vibrating Accelerometer Gyro (VAG)

Referring to FIG. 1, there is shown a simplified top view of a Micro-Silicon Accelerometer (MSA)-based Vibrating Accelerometer Gyro (VAG) 10. The VAG 10 is formed from a monocrystalline silicon body and includes an outer frame 12, outer flexures 14, and a vibrating MSA 16 having a proof mass 18 supported by inner flexures 18a and 18b. The VAG 10 also includes underlying and overlying glass plates having first and second electrodes 20a and 20b disposed on surfaces thereof. Electrodes 20a and 20b are excited in antiphase at the vibrational resonance of the MSA 16 and also serve as differential capacitance pickoffs to stabilize the vibrational amplitude. Also formed on the glass plates are MSA electrodes, referred to herein as forcer electrodes 22. The VAG 10 is packaged in a partial vacuum and provides an integrated angular rate and acceleration sensor. The angular rate is sensed along a rate axis that is transverse to a vibration direction of the MSA 16. An acceleration axis, also referred to as a sensitive axis, is normal to the rate axis, in this case into the sheet of drawing.

The MSA 16 functions as a force balance instrument in which the force of acceleration upon the proof mass 18 is balanced by appropriate electrical restoring forces that are applied to the upper and lower forcer electrodes 22. The magnitude of the required restoring force is a function of the acceleration along the sensitive axis, the acceleration causing the proof mass 18 to attempt to pivot about the inner flexures 18a and 18b.

In operation, an excitation source (shown in FIG. 9 as the block 98) provides a 5 volt peak-to-peak square wave excitation signal at a frequency of 10 Mhz to the substantially planar silicon body that includes the proof mass 18. The AC excitation signal is applied in conjunction with a DC bias potential of 15 V. If the proof mass 18 is in a neutral position (no applied acceleration), the AC signal is coupled equally to the upper and lower electrodes 22. A capacitive pickup between proof mass 18 and the upper and lower electrodes 22 is compared and is used by accelerometer servo amplifiers (shown as 90 and 92 in FIG. 9) to derive an appropriate electrical proof mass restoring force signal for application to the electrodes 22.

In the same micromachining processes that are employed to form the MSA 16, the set of flexures 14 are produced which suspend the frame of the MSA 16 from the outer frame 12. This enables the MSA 16 to be vibrated, or dithered, by the electrodes 20a and 20b in a direction transverse to the sensitive axis. The method of etching the flexures is described in greater detail below with respect to FIGS. 11a-11i.

FIGS. 11a-11i describe a preferred anisotropic etch process for forming the flexures 14. FIG. 11a is a cross-sectional view of a body of silicon having etch masks (EM) applied on top and bottom surfaces. The gap, or aperture, between the etch masks wherein the silicon is exposed defines the extent of the area to be etched. For reference purposes, FIG. 11b illustrates the direction of the 110 plane in the silicon (A), the direction of the 111 plane in the silicon (B), and the direction of the 100 plane in the silicon (C).

FIG. 11c shows the progress of the etch shortly after initiation. As can be seen, the etch proceeds parallel to the 100 planes, but terminates on the 111 planes. FIG. 11d shows that by making the aperture within the etch mask relatively small, the etch will terminate after etching along the 100 planes. This is useful in forming trenches within the surface of the silicon body. FIG. 11e depicts the etch progress at the point of breakthrough. The regions labeled as D show where the 110 planes are revealed. FIG. 11f shows the etch as it nears completion, and illustrates the etch proceeding along parallels to the 110 planes.

The silicon body is removed from the etchant when the desired sidewall shape is achieved. FIGS. 11g, 11h and 11i each depict one possible sidewall shape. A specific shape is selected for providing a beam that yields the required flexure characteristics.

Referring again to FIG. 1, when the MSA 16 is dithered by the electrodes 20a and 20b in a direction transverse to the sensitive axis, the MSA 16 becomes sensitive to rotational motion about the rate axis, the rate axis being mutually perpendicular to the vibration and the sensitive axis as shown. An angular rate input, W, produces an output Coriolis acceleration of value 2 WV, where V is the transverse velocity. The vibration is most readily induced electrostatically by providing the electrodes 20a and 20b along the edges of the accelerometer frame 12, the electrodes being excited at the desired dither frequency (for example 4 Khz).

To obtain a large and readily detectable Coriolis acceleration signal it is advantageous to have a large velocity (V) from the vibrational motion. It is thus desirable to have as large a driving force (F) as possible, as low a mass (M) as possible, as low a vibrational frequency (f) as possible, and as large a resonance amplification factor (Q) as possible.

The vibrational velocity is given by:

$$V = (QF/2\pi fM) \cdot \sin(2\pi ft).$$

In practice, there are compromises which must be struck on each of these parameters. For example, the proof mass M cannot be made too small without degrading the signal to noise ratio and the relative errors caused by micromachining tolerances. Also, it is desirable to have the vibrational frequency f greater than the vibration spectrum of the operating environment in order to avoid interfering acceleration signals.

The resonance amplification factor Q is maximized by partially evacuating the sensor to reduce viscous damping, and also by providing a balanced vibrating structure. That is, when the momenta of the moving parts balance one another, there is no loss of vibrational energy as a result of motion of the outer frame 12 and the associated mounting.

Figure 2:
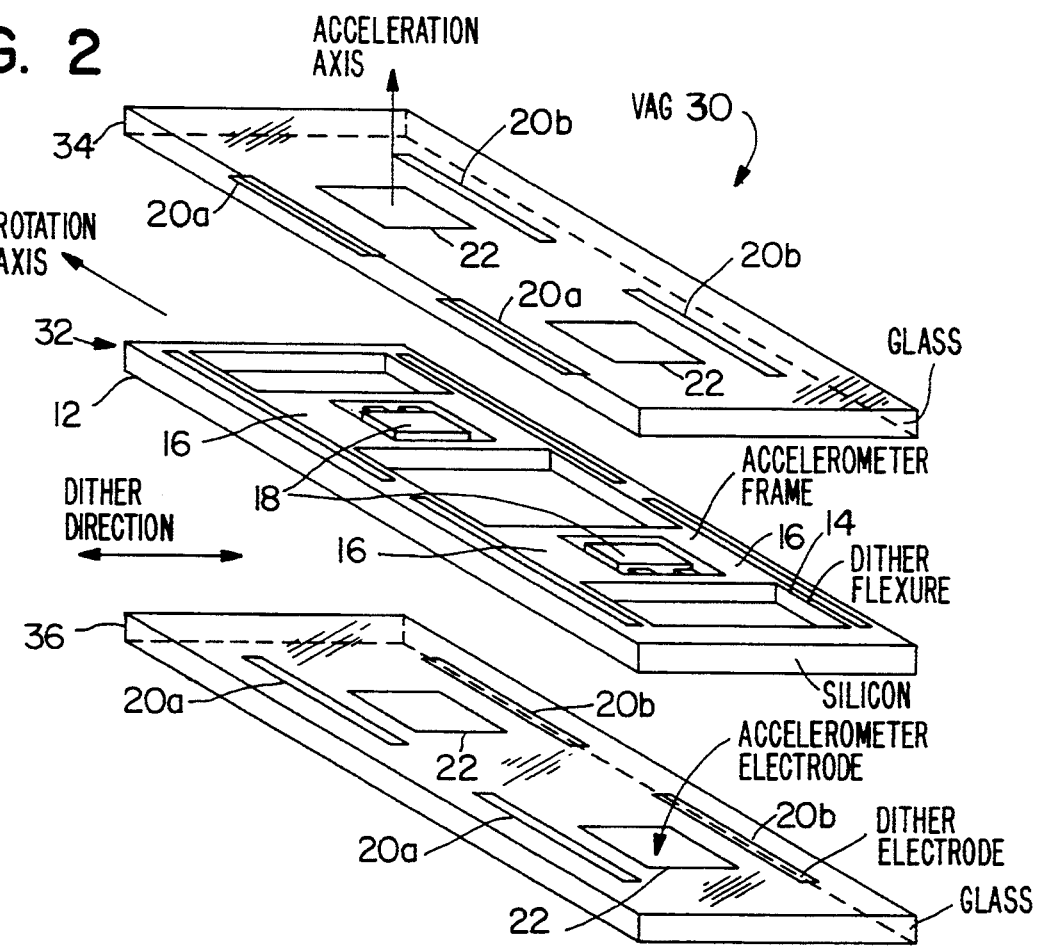
FIG. 2 is an exploded view showing an embodiment of a VAG in accordance with an embodiment of the invention.

FIG. 2 illustrates a VAG 30 structure in which the linear momenta of two vibrating MSAs balance one another. In this embodiment of the invention, the VAG 30 includes a silicon structure 32 that is processed to form two of the MSA structures as shown in FIG. 1. The silicon structure 32 is interposed between a top glass plate 34 and a bottom glass plate 36. The glass plates 34 and 36 include the MSA electrodes 22 and the dither electrodes 20a and 20b. In the drawing of FIG. 2 it can be seen that the silicon structure 32 has a transverse axis of symmetry such that one of the MSA structures is the mirror image of the other. This symmetrical disposition of the vibrating proof masses 18 tends to balance the linear momenta of the MSAs, and increases the Q.

Furthermore, at points between the two MSA frames 16, the flexures 14 couple to the outer frame 12 and also to correspondingly opposite flexures. The connection to the outer frame 12 serves to uniquely define a mode in the vibrational resonance and also to suppress unwanted modes. The connection between the flexures 14 serves to couple together the motions of the two MSA frames 16. The coupling is very strong so that the two MSAs vibrate in antiphase as a single resonant mode with a very accurately defined phase relationship between the motions. The use of two MSAs vibrating in antiphase also provides further advantages. For example, the Coriolis accelerations are in antiphase, while the responses to linear acceleration inputs are in phase. Thus, by adding and subtracting the outputs of the MSAs the linear acceleration information and the gyroscopic rate information can be separated one from another. Another advantage is that it is possible to arrange the MSA suspensions in such a manner as to cancel the anisoinertia error of their combined outputs. The anisoinertia error is an error which occurs in accelerometers having the proof mass hinged on one side. It is a result of the center of percussion of the proof mass differing from its center of suspension, and manifests itself as an unwanted sensitivity to rotation.

Figure 9:
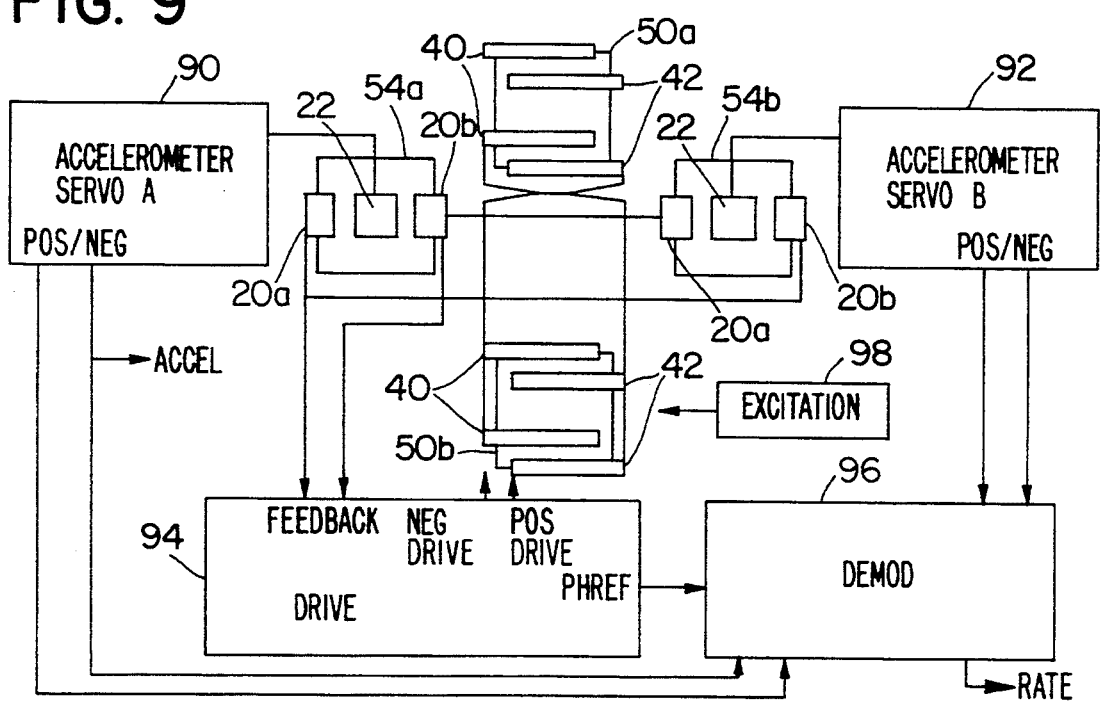
FIG. 9 is a block diagram that illustrates the coupling of the VAG of FIG. 8 to control and sensor electronics.

The acceleration and gyroscopic signals can be separated further by filtering in the frequency domain. The acceleration information is typically expressed at low frequencies, whereas the gyroscopic information is carried by the much higher frequency, for example 4 kHz, of the vibration induced by the dither electrodes 20a and 20b. After filtering, the gyroscopic information is converted to baseband by phase demodulating it against the signal used to generate the driver (dither) force. This signal is in phase with the velocity of the vibration and in quadrature with the displacement or acceleration. Thus, the phase demodulation process isolates the Coriolis rate signal from interfering signals produced by out-of-plane components of the vibration. In FIG. 9, phase demodulation is accomplished by the block 96, in conjunction with a phase reference (Pref) signal provided by a driver block 94.

It is a particular advantage of the illustrated glass-silicon-glass multilayered VAG 30 structure of FIG. 2 that all of the electrodes are coplanar on the surfaces of the glass plates 34 and 36. This configuration minimizes direct capacitive coupling between the driver (dither) electrodes 20a and 20b and the accelerometer electrodes 22. This coupling would otherwise induce unwanted biases into the gyroscopic information. The coupling is further reduced by the fact that these electrodes are separated on the glass plates by a distance that is large compared with the distance to the underlying substantially planar silicon structure 32 and the outer metalization of the glass plates 34 and 36, both of which are at maintained at ground potential for the vibration frequency, and therefore act as electrostatic shields. For very low and very high frequencies, compared with the vibration, the silicon structure 32 is not at ground potential, as is explained in U.S. patent application Ser. No. 07/640,449.

The electrostatic force F that is applied by the dither electrodes 20a and 20b to the silicon structure 32 is given by $$F = \epsilon L V^2 / 2D,$$

where V is the applied voltage, e the dielectric constant of free space, D the glass-silicon separation, and L the length of the silicon edge being acted on by the electrode.

An aspect of this invention exploits this relationship by maximizing the edge length L. A preferred approach to maximize the edge length is to provide a plurality of parallel trenches that are etched into both major surfaces (top and bottom) of the silicon structure. Each of the plurality of trenches thus provides a pair of edges which are used to attract the silicon structure in one direction or the opposite direction. A preferred dither electrode configuration for use with the trenches is an interdigitated geometry as shown in FIGS. 3 and 4.

Figure 3:
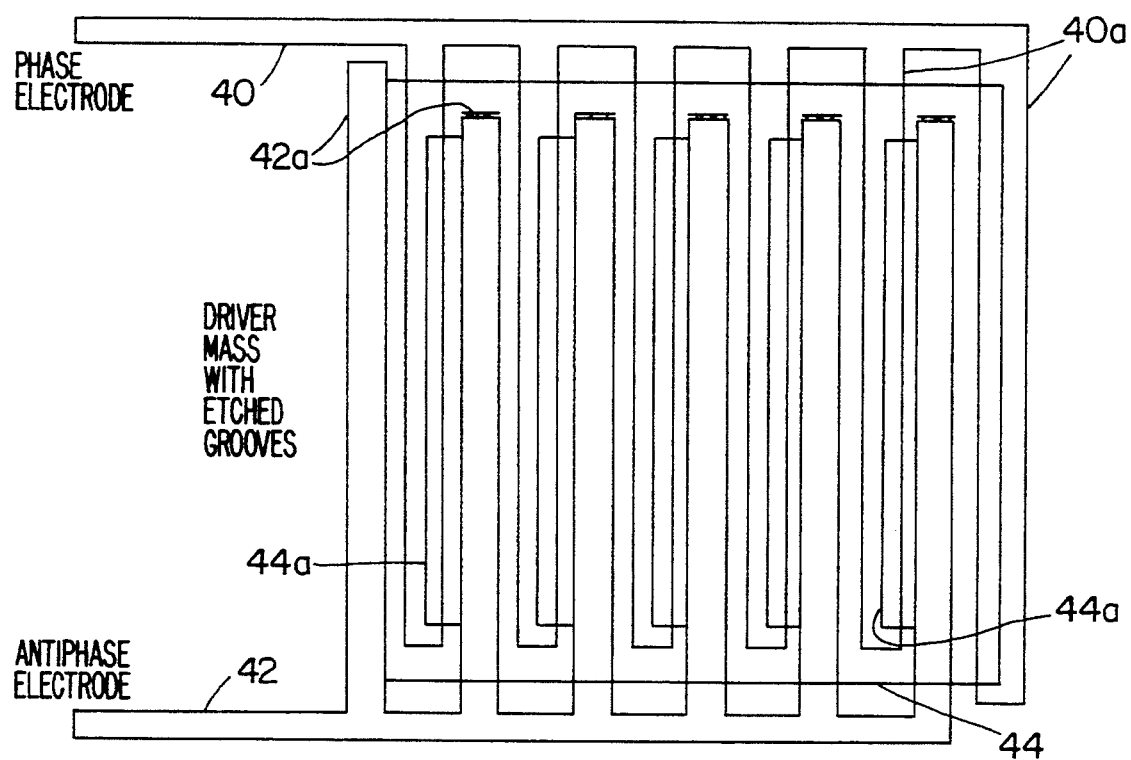
FIG. 3 is an enlarged top view showing interdigitated dither electrodes disposed above a grooved driver mass.

Specifically, FIG. 3 shows a phase electrode 40 and an antiphase electrode 42. The phase electrode 40 includes a plurality of elongated parallel fingers 40a, or combs, that are interdigitated with corresponding fingers 42a of the antiphase electrode 42. A pair of phase and antiphase electrodes 40 and 42 are provided on each of the glass plates 34 and 36.

Interposed between the glass plates 34 and 36 is a driver mass 44. The driver mass 44 is a region of the substantially planar silicon structure, and is coupled thereto by suitably formed flexures. The driver mass 44 has a plurality of grooves 44a that are etched into top and bottom surfaces thereof. As is seen in the cross-sectional view of FIG. 4, the phase and antiphase electrodes 40 and 42 are disposed to overlie the grooves 44a such that finger portions 40a and 42a of the electrodes 40 and 42, respectively, are aligned parallel to the length of the edges of the grooves 44a. The grooves 44a beneficially increase the effective edge length that is acted upon by the interdigitated electrodes 40 and 42, and thus serve to increase the electrostatic force as described above.

The force exerted by the electrodes 40 and 42 on the driver mass 44 along the edges of the grooves 44a is given by the following expression:

$$\begin{aligned} \text{Force} &= dE/dx \\ &= V^2/2 \cdot dC/dx \\ &= V^2/2 \cdot \epsilon/D \cdot dA/dx \\ &= \epsilon L V^2 / 2D, \end{aligned}$$

where E is electrostatic energy, V is a voltage difference between the electrodes and the silicon, A = Lx is area, L is length, x is displacement in the plane of the silicon, $\epsilon$ the dielectric constant of free space, C is capacitance, and D is the spacing between the electrodes and the silicon driver mass.

The use of the interdigitated electrodes 40 and 42 with the grooved driver mass 44 has a secondary advantage of further distancing the drive signals from the accelerometer frame. This in turn, reduces direct electrical interferences between the drive and accelerometer signals.

It is significant to note that the interdigitated electrodes 40 and 42 that are employed in the bulk micromachined structure of this invention differ from superficially similar interdigitated structures found in surface micromachined devices. For example, one such surface micromachined structure is employed as an accelerometer for activating an airbag, and is described in an article appearing in Electronic Design, Aug. 8, 1991 (pp. 45–56). This type of surface micromachined device has several characteristics which make it unsuitable for use in a gyroscope having a reasonable degree of accuracy.

By example, the interdigitated elements of the surface micromachined structure are both made of silicon and act by direct surface-to-surface attraction, rather than by the edge attraction of device of this invention. Also, one comb is a static element and the other is a moving element. In contrast, in the structure of this invention both combs over the top and bottom silicon surfaces are static, being deposited on the glass plates.

There are three major disadvantages of the surface micromachined structure as applied to gyroscopes. First, surface micromachined devices are asymmetric out-of-plane, there being no structure which can exactly correspond to the silicon substrate on one side. This symmetry is important to gyroscopic accuracy, and is preserved in the glass-silicon-glass multilayered structure of this invention.

Second, the direction of the driving force and flexural stiffness is determined by shallow vertical etch walls which are difficult to control to a precise angle. Thus, a significant out-of-plane motion at the fundamental frequency of vibration can readily exist. In contradistinction, the device of this invention has deep vertical etch walls (approximately 100 times deeper than found in conventional surface micromachined structures) with a control datum on each side to ensure the direction of flexural stiffness. Also, the etched gaps on both sides between the electrodes and the silicon are substantially identical, being produced at the same time during the etching process. This significantly reduces any out-of-plane force (from imbalance of the two sides). Further, should there be any such imbalance, it induces forces in the same direction on both half cycles of dither, thereby inducing motion at a second harmonic of the dither motion rather than at the fundamental frequency of the dither motion. This second harmonic component, if there be any, is comparatively insignificant in its effect on gyro accuracy.

Third, the driving force in the surface micromachined device varies as the inverse square of the gap between the combs and is, therefore, a strong function of the dither motion. This makes the control of amplitude a difficult non-linear problem. As the gyro oscillation grows, so does the force causing it. As a result, there is a tendency for the amplitude to "run-away" until it is naturally limited by the combs contacting one another. In contrast, the driving force in the device of this invention is invariant with the dither motion over a large working range. This results in a smooth, easily controlled behavior.

A separately driven structure in which the momenta are made to balance in a well defined fundamental mode is shown in FIG. 5. The structure in FIG. 5 includes first and second separately provided grooved driver masses 50a and 50b, accelerometer frames 52a and 52b, corresponding proof masses 54a and 54b, a plurality of mode defining flexures 56, and a plurality of main flexures 58. An outer frame 60 is bonded to the overlying and underlying glass plates, which include the interdigitated dither electrodes 40 and 42, that overlie the driver masses 50a and 50b, and the MSA electrodes 22 that overlie the proof masses 54a and 54b. For clarity, the electrodes are not illustrated in FIG. 5.

This embodiment of the invention has many desirable properties, including a very "distinct" set of vibrational modes. That is, the desired mode of vibration is the fundamental, and overtones are well displaced to higher frequencies. As such, the overtones do not involve linear out-of-plane displacements, except at considerably higher frequencies, so that their probability of excitation is low, As a result, the overtones do not interfere with the stability of the accelerometer servos.

Figure 6:
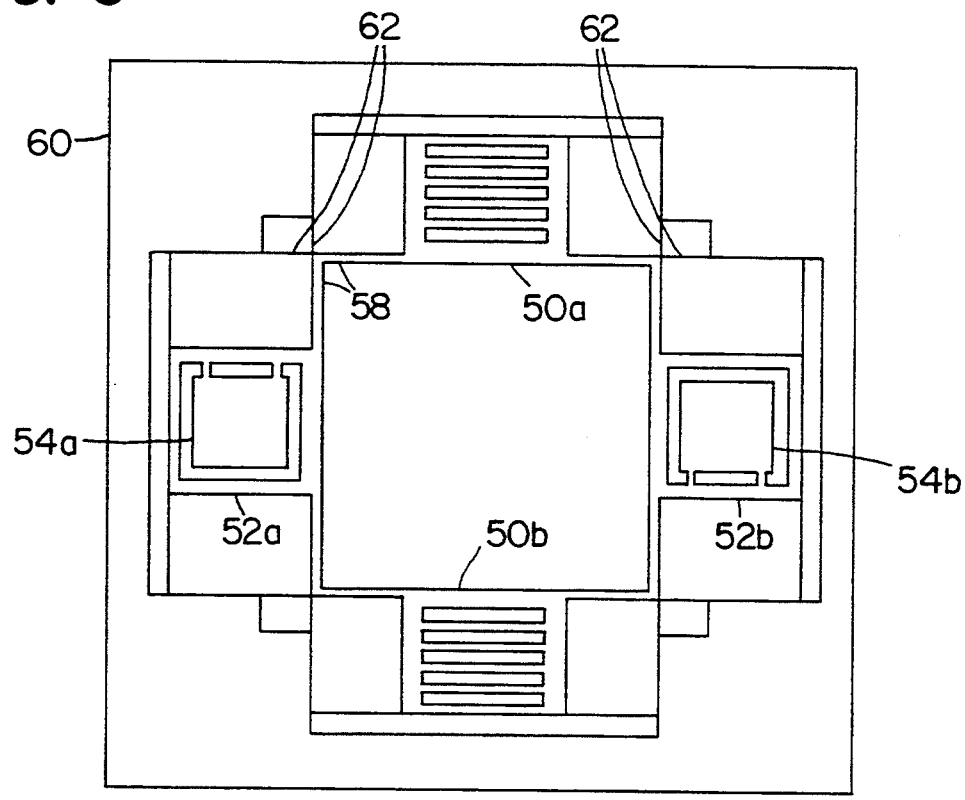
FIG. 6 is a top view showing an embodiment of a VAG wherein the substantially linear VAG configuration of FIG. 5 is folded into a quadrilateral configuration.

The embodiment of FIG. 5 has one relatively long dimension which, for some applications, may be undesirable. The presence of this relatively long linear dimension is eliminated by folding the structure into the quadrilateral VAG arrangement shown in FIG. 6, wherein the various components and structures shown in FIG. 5 are numbered correspondingly. The embodiment of FIG. 6 retains the distinct modal structure and the balance of the fundamental mode of oscillation of the embodiment of FIG. 5. Also, by a suitable choice of lengths and thicknesses for a plurality of suspensory ligaments 62 and the main flexures 58, the effect of micromachining tolerances on the gyroscopic errors can be minimized.

Figure 7:
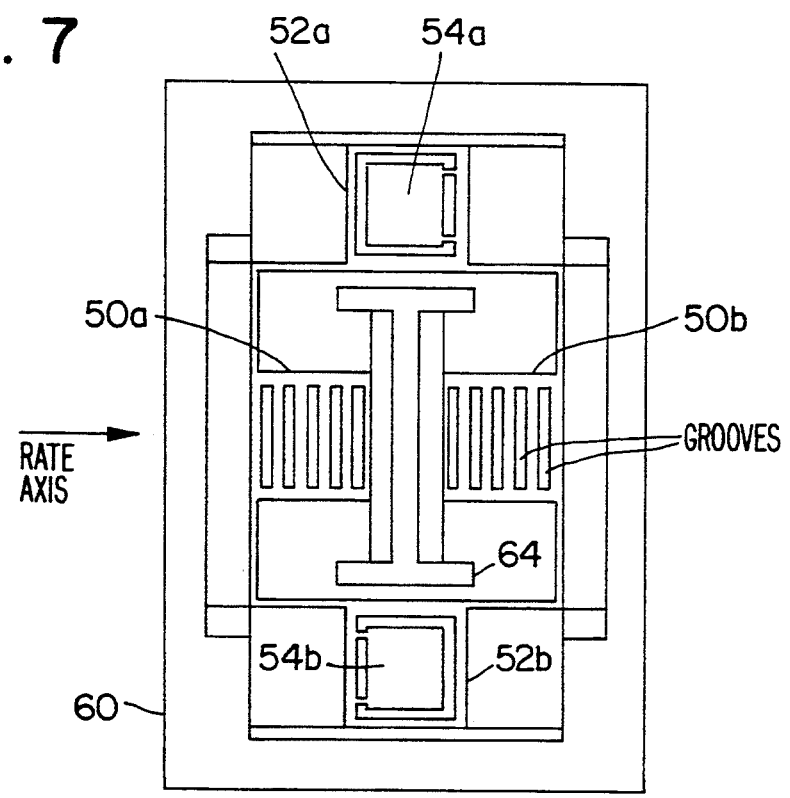
FIG. 7 is a top view showing a further embodiment of a VAG.

As is illustrated in FIG. 7, the structure can be made even more compact. In this embodiment of the invention the separately provided electrostatic driver masses 50a and 50b are moved inwardly so as to be disposed between the first and second MSAs comprised of accelerometer frames 52a and 52b and their associated proof masses 54a and 54b. A centrally provided silicon frame 64 is employed in conjunction with the outer silicon frame 60 for bonding to the overlying and underlying glass plates (not shown).

The MSA comprised of the structures 52b and 54b is dithered at f=4 kHz with a peak velocity V=1 m/s in a direction perpendicular to the rotation sensing rate axis. The MSA comprised of the structures 52a and 54a is simultaneously dithered in antiphase (180° out of phase) with the MSA comprised of structures 52b and 54b. This enables the gyroscopic and acceleration signals to be separated by subtraction and addition, as well as by frequency domain filtering.

In the presence of an angular rate, $\Omega$, each MSA gives an output of magnitude $2\Omega V_o \sin(2\pi ft)$. Any components of the dither motion which are out of plane give accelerations in quadrature with this signal and are suppressed, preferably, by phase demodulation.

Figure 10:
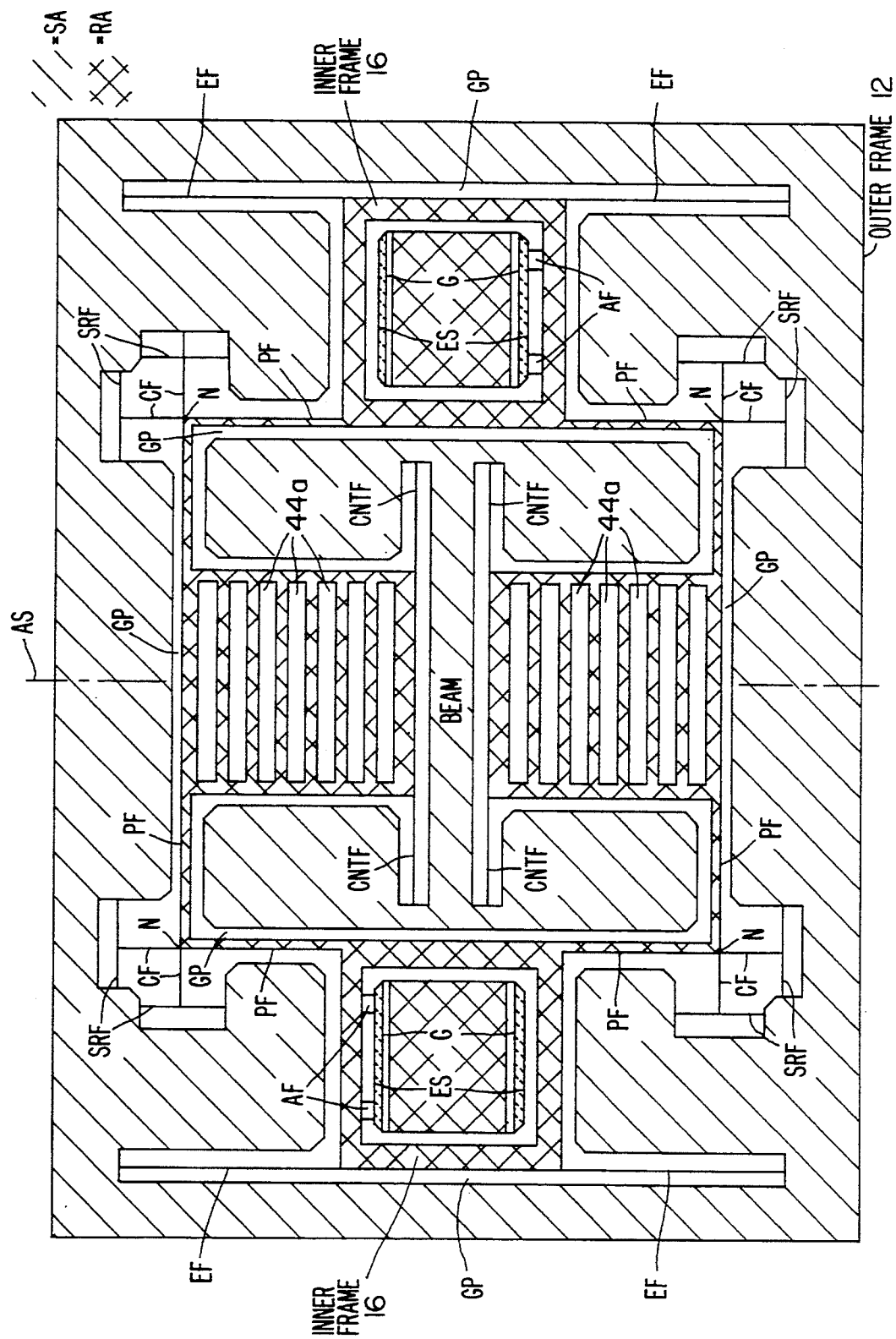
FIG. 10 is a top view that illustrates in greater detail the construction of a presently preferred embodiment of the VAG.

FIG. 10 illustrates a presently preferred embodiment of the invention. In FIG. 10 the cross-hatched region support areas (SA) illustrate where silicon is retained to support the glass plates and is anodically bonded to the glass plates to ensure that gaps are well defined. The clear areas designated GP illustrate the gaps between the bonded glass supports and the vibrating structures. These gaps are locally narrowed to prevent excessive motion of the suspended structure under shock and vibration. The doubly cross-hatched regions (reduced silicon areas (RA)) are those wherein the silicon is etched to be approximately three micrometers below the surrounding retained silicon areas (the anodic bonding area) on both sides of the silicon body Regions acting as proof mass "end stops", designated ES in FIG. 10, are regions of each proof mass that are coated with a refractory metal oxide. Corresponding end stop electrodes of relatively thick dimensions, as compared to the forcer electrodes, are provided on the overlying glass plates. These structures are shown in greater detail in the view of FIG. 12. Each proof mass is also provided with grooves (G) that underlie and that are disposed between the accelerometer forcer electrodes and the end stop electrodes.

It should be noted that the end stops can also be provided by etching the proof mass to leave it slightly thicker in the region of ES, and placing a relatively thin refractory metal oxide on the glass electrode in the appropriate area.

Exemplary dimensions for the VAG shown in FIG. 10 are given in the following Table.

TABLE

| | |
|---|---|
| Overall (including glass) | 1.3 × 16 × 14 mm |
| Masses | 0.3 × 3.2 × 3.2 mm |
| End flexures (EF) | 0.3 × 2.9 × 0.05 mm |
| Corner flexures (CF) | 0.3 × 1.0 × 0.05 mm |
| Center flexures (CNTF) | 0.3 × 1.6 × 0.05 mm |
| Stress Relief flexures (SRF) | 0.3 × 1.3 × 0.05 mm |
| Primary flexures (PF) | 0.3 × 2.0 × 0.1 mm |
| Accelerometer flexures (AF) | 0.007 × 0.1 × 0.1 mm |

The end flexures (EF), corner flexures (CF), center flexures (CNTF), and stress relief flexures (SRF) are all considered to be suspensory flexures (SF).

As seen in FIG. 10 the structure includes a centrally disposed central support region that includes a beam having a long axis. The structure has a centrally disposed axis of symmetry (AS) such that the left half of the structure is the mirror image of the right half. The primary flexures (PF) form a quadrilateral structure and are relatively thick as compared to the other flexures. The primary flexures define the fundamental mode of oscillation in which all the moving masses are tightly coupled. The relatively thin suspensory flexures (SF) serve to attach the primary flexures (PF) to the outer frame 12. The suspensory flexures (SF) couple the vibrating structure to the outer frame 12 as weakly as is possible in the vibration plane but, being thick (0.3 mm) in comparison to their width (0.05 mm), nonetheless serve to maintain the vibrating structure centered between the glass plates. During vibration, the primary flexures (PF) essentially pivot about the corner nodes (N) where they join the suspensory flexures (CF). The quadrilateral inner frames and their associated proof masses undergo a linear motion that is substantial in amplitude compared with the width of the flexures (approximately 40 microns for a velocity of 1 meter per second at 4 kHz). Consequently they are subject to tensile stress which can cause an undesirable non-linearity of their stiffness. To alleviate this, the suspensory flexures (CF) are terminated in the transverse flexures, or stress relief flexures (SRF). This technique is known to those versed in the art of flexure design, for example in the dither spokes of laser gyroscopes or suspensions of dry tuned gyroscopes. It essentially eliminates those problems associated with the "stress-stiffening" of beams and the associated frequency shifts.

The moving portions of the structure of FIG. 10 are free by virtue of a first shallow (e.g. 3 micron) etch which forms a gap between them and the glass, when the silicon structure is anodically bonded to the glass plates. That is, the top and bottom major surfaces of the moving portions of the silicon structure are recessed below the top and bottom major surfaces of the silicon structure by approximately three micrometers. As little silicon as possible is removed from around the moving portions of the structure so that the glass is bonded to and supported by silicon over most of its area. This serves to make the gap less susceptible to perturbation by warping the glass relative to the silicon.

The smallness of the gaps between the silicon and the glass is such that very little displacement of the proof masses is possible in a direction that is perpendicular to the vibration plane. Also, the space around the proof mass frames and around the driver masses is deliberately restricted, forming "end stops" for motion in the vibration plane. The maximum displacements are such that the strain in the silicon cannot reach its breaking point. This makes the structure very rugged, which is a considerable advantage.

Standoffs can be used for the accelerometer proof masses to prevent electrostatic sticking, as disclosed in U.S. patent application Ser. No. 07/640,449. However, there is a considerable advantage to be gained by using the linear, strip shaped end stop (ES) regions shown in FIG. 10 and in greater detail in the cross-sectional view of FIG. 12. There are corresponding "end stop" strip electrodes (ESE) on the glass which are maintained at the same potential as the silicon. Alongside the linear end stop (ES) regions are self-terminating trenches or gaps (G). The gaps (G) are fabricated by the same etch process as the driver trenches 44a. The gaps (G) serve to reduce the effect of an ill defined potential at the insulating gap between the end stops (ES) and the forcer electrodes.

The overlying end stop strip electrodes (ESE) that are disposed upon the glass plates (34, 36) have their extended dimension in the direction of the dither motion. As a result, no problem is presented with respect to alignment due to motion in that direction. Like the corresponding end stop regions (ES), the end stop electrodes (ESE) are preferably coated with a refractory metal, such as Titanium-Tungsten alloy which has an oxidized surface. This coating serves a number of purposes. It prevents sticking during anodic bonding and resists damage should the proof masses contact their end stops while dithering. Pads of the coating are also advantageously placed on the dither drive comb electrodes (40,42) to prevent sticking during anodic bonding.

One particular advantage of the strip form of these endstops is that it eliminates the need for a special etch to align the top and bottom forcer areas after the slightly asymmetric process which forms the accelerometer flexures. This reduces process cost and increases yield.

Figure 8:
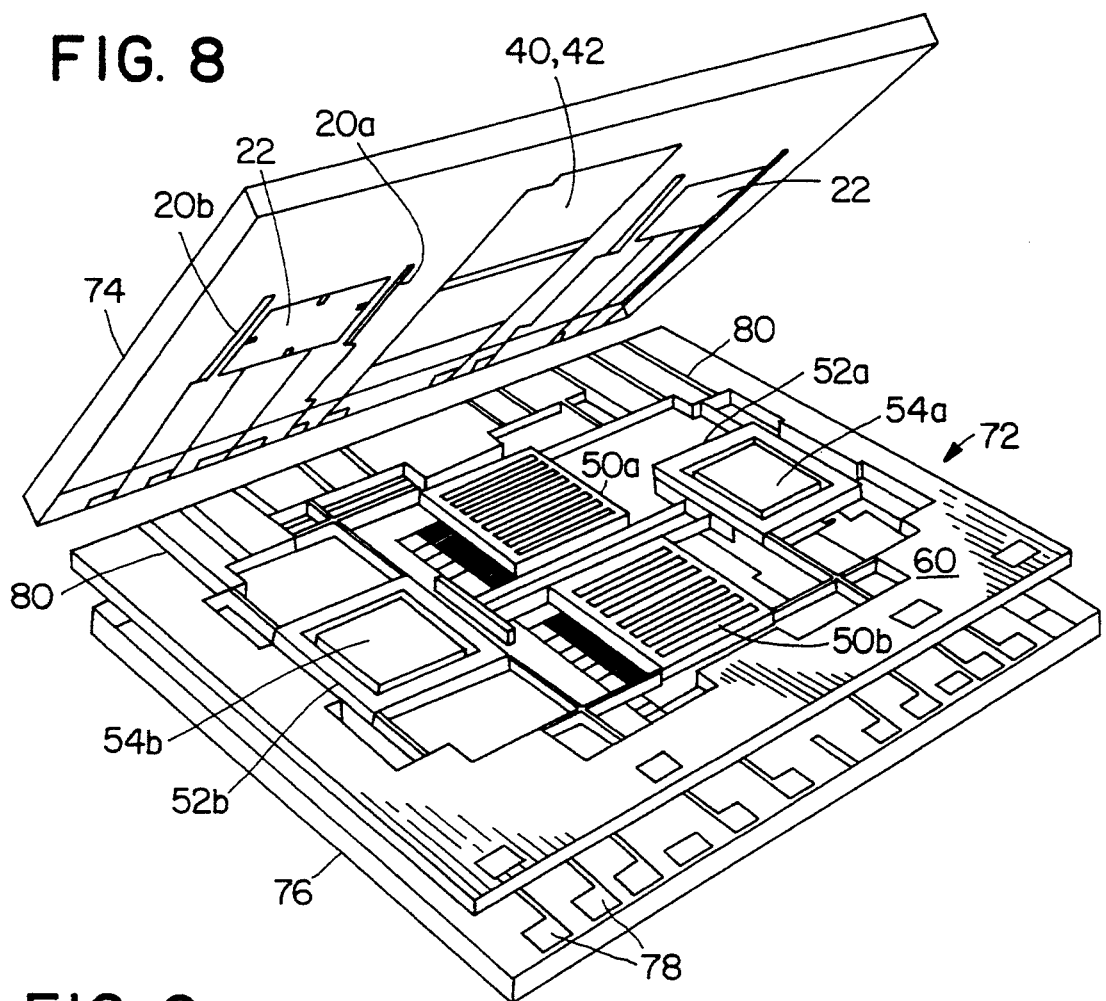
FIG. 8 is an exploded elevational view of the presently preferred embodiment of the VAG.

FIG. 8 illustrates an elevational exploded view of the VAG of FIG. 7, wherein a top glass plate 74 has been partially rotated about one edge. A substantially planar micromachined silicon structure 72 is interposed between the top glass plate 74 and a bottom glass plate 76 such that a first major surface of the structure 72 is disposed beneath a surface of the top glass plate 74, and a second major surface is disposed over a surface of the bottom glass plate 76. The glass plates 74 and 76 are patterned with sputtered metal, such as gold, to form contact pads 78 and electrodes, including the interdigitated driver electrodes 40 and 42, pickoff electrodes 20a and 20b, and the MSA electrodes 22. The interdigitated driver electrodes 40 and 42 are disposed over the grooved driver masses 50a and 50b, as depicted in FIGS. 3 and 4.

The glass plates 74 and 76 are anodically bonded to the silicon structure 72 by a process that chemically combines these two materials along their touching interfaces. The glass is preferably selected so as to have approximately the same coefficient of thermal expansion as that of the silicon structure 72. By example, one suitable glass for the upper and lower glass plates is known as 7740 brand borosilicate Pyrex glass.

The tolerances for the metalization on the glass plates and for the silicon structures are approximately 5 micrometers in the plane of the silicon and 0.1 micrometers in the thickness direction. The monocrystalline silicon of the silicon structure 72 has a Young's modulus of 170 GPa and a tensile strength of greater than 2 GPa in the planes of interest.

Preferably, trenches 80 are formed within the surfaces of the silicon structure 72 to accommodate electrically conductive traces. This advantageously removes these traces from the surface of the silicon structure 72 and prevents shorting to the metal electrodes and contact pads on the glass plates 74 and 76.

FIG. 9 is a simplified block diagram showing the VAG 70 of FIG. 8 with associated control and sensing circuitry. In FIG. 9, only those primary electrodes disposed upon one of the glass plates 74 or 76 are illustrated. MSA electrodes 22 are suspended above proof masses 54a and 54b for sensing capacitance and for applying the force restoring signal that is output from accelerometer servo amplifiers 90 and 2. Pickoff electrodes 20a and 20b provide proof mass position signals and close the loop for the accelerometer amplifiers 90 and 92. The interdigitated driver electrodes 40 and 42 are coupled to a driver module 94 and are interconnected as shown to provide phase and antiphase electrostatic forces upon underlying driver masses 50a and 50b. The driver masses 50a and 50b are grooved as illustrated in FIGS. 3 and 4. An electrical signal representative of acceleration is derived by the accelerometer servo A 90. The positive and negative outputs of the accelerometer servos 90 and 92 are input to a phase demodulator 96. Phase demodulator 96 also receives a phase reference (Phref) signal from the driver module 94, the phase reference signal being indicative of the positive and negative dither drive signals that are applied to the interdigitated electrodes 40 and 42. Phase demodulator 96 employs the phase reference signal to convert the accelerometer servo outputs, at the dither frequency, to baseband, this signal being indicative of the rotation rate about the rate axis. The excitation block 98 provides the 10 Mhz excitation signal and 15 V reference signal to the silicon structure, particularly, the proof masses 54a and 54b.

Although described above in the context of a structure fabricated from monocrystalline silicon, it should be realized that the teaching of this invention may be employed to fabricate a combined angular rate and acceleration sensor from other electrically conductive materials that are suitable for being etched to form microstructures, that are capable of being bonded to an electrode-carrying insulator, and that exhibit good elastic properties.

Thus, while the invention has been particularly shown and described with respect to exemplary and preferred embodiments thereof, it will be understood by those skilled in the art that changes in form and details may be made therein without departing from the scope and spirit of the invention.

What is claimed is:

1. A combined angular rate and acceleration sensor comprising a structure formed from a substantially planar, monolithic body of electrically conductive material having first and second major surfaces, said structure having an outer frame portion disposed around first and second inner frame portions, each of said inner frame portions being disposed around an associated proof mass and connected thereto through a plurality of flexures, said structure further comprising a driver mass portion that is interposed between said first and second inner frame portions, said driver mass portion being connected to said first and said second inner frame portions through a plurality of primary flexures, said plurality of primary flexures and said first and said second inner frame portions being connected to said outer frame portion through a plurality of suspensory flexures.

2. A combined angular rate and acceleration sensor as set forth in claim 1 wherein said structure further includes a centrally disposed support structure that includes a beam having a long axis that passes through each of said proof masses, wherein said driver mass portion is comprised of a first driver mass having a quadrilateral shape having an edge parallel to one side of said beam and a second driver mass having a quadrilateral shape having an edge parallel to an opposite side of said beam, and wherein said edge of each of said first and said second driver masses is connected to said centrally disposed support structure through first and second center flexures that are each disposed parallel to said sides of said beam.

3. A combined angular rate and acceleration sensor as set forth in claim 2 wherein said first and second driver masses each have a plurality of linear grooves formed in first and second major surfaces thereof for defining a plurality of groove edges, said grooves being disposed parallel to said sides of said beam, and wherein said sensor further includes a plurality of first and second electrodes each having a plurality of elongated finger portions that are disposed in parallel and interdigitated one with another, said finger portions of each of said plurality of first and second electrodes being disposed over one of said plurality of linear grooves in a parallel orientation therewith for exerting an electrostatic force upon said groove edges in response to an oscillatory drive signal, the electrostatic force causing a vibration of said first and second driver masses, the vibration being coupled through said primary flexures for causing a vibration of said first and second proof masses.

4. A combined angular rate and acceleration sensor as set forth in claim 1 wherein said plurality of primary flexures are disposed to form a quadrilateral primary flexure structure, wherein a first side of said quadrilateral primary flexure structure is connected to a first side of said first inner frame portion, wherein a second, opposite side of said quadrilateral primary flexure structure is connected to first side of said second inner frame portion, and wherein each corner of said quadrilateral primary flexure structure is connected to a plurality of corner flexures each of which is connected to said outer frame portion through a stress relief flexure.

5. A combined angular rate and acceleration sensor as set forth in claim 4 wherein said first and said second inner frame portions each have a quadrilateral shape, and wherein a second, opposite side of each of said inner frame portions is connected to said outer frame portion through first and second end flexures that are disposed parallel to said second, opposite side of each of said inner frame portions.

6. A combined angular rate and acceleration sensor comprising:
- at least one accelerometer formed from a substantially planar body comprised of electrically conductive material, said at least one accelerometer including a first frame and a proof mass suspended from said first frame by first flexures, said at least one accelerometer having an associated sensitive axis and an associated rate axis that is orthogonally disposed to said sensitive axis; and
- means for dithering said proof mass along a dither axis that is disposed perpendicularly to said rate axis, said dithering means comprising at least first and second electrodes each having a plurality of elongated finger portions that are disposed in parallel and interdigitated one with another, said finger portions being disposed for exerting an electrostatic force upon a portion of said planar body in response to an oscillatory drive signal, wherein said portion of said planar body has a plurality of linear grooves formed therein, said plurality of linear grooves being disposed in a parallel orientation with said finger portions.

7. A combined angular rate and acceleration sensor as set forth in claim 6 wherein said electrically conductive material is comprised of monocrystalline silicon.

8. A combined angular rate and acceleration sensor as set forth in claim 6 and further comprising means for determining a magnitude of an acceleration of said proof mass along said sensitive axis and for determining an angular rotation rate of said proof mass about said rate axis.

9. A combined angular rate and acceleration sensor as set forth in claim 8 wherein said determining means includes means for phase demodulating an output of a proof mass displacement sensor means in accordance with said oscillatory drive signal for determining the angular rotation rate of said proof mass about said rate axis.

10. A combined angular rate and acceleration sensor as set forth in claim 6 and further comprising a second frame that is disposed about said first frame, said first frame being connected to said second frame by second flexures.

11. A combined angular rate and acceleration sensor as set forth in claim 10 wherein said portion of said planar body having said plurality of grooves is connected to said second frame by third flexures.

12. A combined angular rate and acceleration sensor as set forth in claim 10 wherein said portion of said planar body having said plurality of grooves is also connected to said second frame by said second flexures.

13. A combined angular rate and acceleration sensor as set forth in claim 6 wherein said at least one proof mass includes a first electrode disposed upon a first surface thereof and a second electrode disposed upon a second, opposite surface thereof, said at least one proof mass further including a first end stop and a second end stop disposed on each of said major surfaces, said first and said second end stops each being comprised of a layer of material and having a linear shape that is disposed along an edge of said at least one proof mass, said at least one proof mass also including a first groove and a second groove formed into each of said first and said second major surfaces, said first and said second grooves being disposed between said first and said second end stops and said electrode.

14. A combined angular rate and acceleration sensor, comprising:
- a first accelerometer and a second accelerometer each formed from a substantially planar body comprised of monocrystalline silicon, said planar body having first and second oppositely disposed major surfaces, each of said accelerometers including a first frame and a proof mass suspended from said first frame by first flexures, each of said accelerometers having an associated sensitive axis and an associated rate axis that is orthogonally disposed to said sensitive axis;
- a second frame that is disposed about each of said first frames, each of said first frames being connected to said second frame by second flexures;
- means for sensing a displacement of each of said proof masses; and
- means for dithering each of said proof masses along a dither axis that is disposed perpendicularly to said rate axis, said dithering means including,
- at least one first electrode and at least one second electrode, said at least one first electrode and said at least one second electrode each including a plurality of elongated finger portions that are disposed in parallel and interdigitated one with another, said first electrode being disposed over said first major surface and said second electrode being disposed over said second major surface each for exerting an electrostatic force upon an underlying portion of said planar body in response to an oscillatory drive signal, wherein each of said underlying portions of said planar body are connected to said second frame by third flexures, and wherein each of said underlying portions of said planar body has a plurality of grooves formed therein, said plurality of grooves being disposed in a parallel orientation with said finger portions of the overlying electrode.

15. A combined angular rate and acceleration sensor as set forth in claim 14 and further comprising means coupled to said sensing means for determining a magnitude of an acceleration of at least one of said proof masses along said sensitive axis and for determining an angular rotation rate of at least one of said proof masses about said rate axis.

16. A combined angular rate and acceleration sensor as set forth in claim 15 wherein said determining means includes means for phase demodulating an output of said sensor means in accordance with said oscillatory drive signal for determining the angular rotation rate of said at least one proof mass about said rate axis.

17. A combined angular rate and acceleration sensor, comprising:
- a substantially planar body comprised of monocrystalline silicon, said planar body having first and second oppositely disposed major surfaces, said planar body having portions selectively removed for defining a plurality of regions of said planar body, said plurality of regions including, a first region comprising a quadrilateral outer frame structure;

a second region comprising a first accelerometer having a quadrilateral first inner frame structure and a first proof mass suspended from said first inner frame structure by first flexures, said first inner frame structure being connected to said outer frame structure by second flexures;

a third region comprising a second accelerometer having a quadrilateral second inner frame structure and a second proof mass suspended from second inner frame structure by third flexures, said second inner frame structure being connected to said outer frame structure by fourth flexures;

wherein each of said first and second accelerometers has an associated sensitive axis and an associated rate axis that is orthogonally disposed to said sensitive axis;

said regions further including, a fourth region comprising centrally disposed support structure;

a fifth region comprising a first driver mass having a plurality of grooves formed in first and second major surfaces thereof, said first driver mass being connected to said outer frame structure and to said support structure by fifth flexures; and a sixth region comprising a second driver mass having a plurality of grooves formed in first and second major surfaces thereof, said second driver mass being connected to said outer frame structure and to said support structure by sixth flexures; wherein said first and said second driver masses are also connected to said inner frames of said first and said second accelerometers through primary flexures;

said integrated acceleration and rate sensor further including, a first planar structure having a surface overlying said first major surface of said planar body, said first planar structure having a first plurality of electrodes formed upon said surface, said first plurality of electrodes including a first forcing electrode that overlies said first proof mass, a second forcing electrode that overlies said second proof mass, a first pair of interdigitated drive electrodes overlying said grooves of said first driver mass, and a second pair of interdigitated drive electrodes overlying said groves of said second driver mass; and a second planar structure having a surface overlying said second major surface of said planar body, said second planar structure having a first plurality of electrodes formed upon said surface, said first plurality of electrodes including a first driver electrode that overlies said first proof mass, a second driver electrode that overlies said second proof mass, a first pair of interdigitated drive electrodes overlying said grooves of said first driver mass, and a second pair of interdigitated drive electrodes overlying said groves of said second driver mass, wherein the plurality of pairs of interdigitated drive electrodes are responsive to an oscillatory drive signal for exerting an electrostatic force upon edges of said trenches for dithering said driver masses in phase and antiphase within a plane of said planar body and, through said primary flexures, for dithering said first and said second accelerometers in phase and antiphase in a direction that is orthogonal to said associated sensitive axis of each of said first and second accelerometers.

18. A combined angular rate and acceleration sensor as set forth in claim 17 wherein said first and said second planar structures are each comprised of a material selected to have a coefficient of thermal expansion that is similar to that of said monocrystalline silicon.

19. A combined angular rate and acceleration sensor as set forth in claim 17 and further comprising means coupled to said driver electrodes for determining a magnitude of an acceleration of at least one of said proof masses along said sensitive axis and for determining an angular rotation rate of said proof masses about said rate axis.

20. A combined angular rate and acceleration sensor as set forth in claim 19 wherein said determining means includes means for phase demodulating signals received from said driver electrodes in accordance with said oscillatory drive signal for determining the angular rotation rate.

* * * * *